US010267332B2

(12) United States Patent
Watanabe et al.

(10) Patent No.: US 10,267,332 B2
(45) Date of Patent: Apr. 23, 2019

(54) COMPRESSOR

(71) Applicant: MITSUBISHI HEAVY INDUSTRIES, LTD., Tokyo (JP)

(72) Inventors: Daigo Watanabe, Tokyo (JP); Isao Tomita, Tokyo (JP); Ryoji Okabe, Tokyo (JP); Hiroshi Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 346 days.

(21) Appl. No.: 15/309,395

(22) PCT Filed: Jul. 2, 2014

(86) PCT No.: PCT/JP2014/067703
§ 371 (c)(1),
(2) Date: Nov. 7, 2016

(87) PCT Pub. No.: WO2016/002031
PCT Pub. Date: Jan. 7, 2016

(65) Prior Publication Data
US 2017/0074278 A1 Mar. 16, 2017

(51) Int. Cl.
F01D 21/04 (2006.01)
F02B 33/40 (2006.01)
(Continued)

(52) U.S. Cl.
CPC ......... F04D 29/4206 (2013.01); F01D 9/026 (2013.01); F01D 25/24 (2013.01);
(Continued)

(58) Field of Classification Search
CPC .. F04D 29/023; F04D 29/4226; F01D 21/045; F01D 9/00; F05D 2300/433; F05D 2300/44; F05D 2300/50212
See application file for complete search history.

(56) References Cited

U.S. PATENT DOCUMENTS 7,249,939 B2  7/2007 Yanagihara et al.
8,383,244 B2  2/2013 Bayer et al.
(Continued)

FOREIGN PATENT DOCUMENTS

CN    2685616 Y    3/2005
CN   102827471 A   12/2012
(Continued)

OTHER PUBLICATIONS

Material Characteristics of Duroplast and Technopolymer (Year: 2016).*
(Continued)

Primary Examiner — David E Sosnowski
Assistant Examiner — Maranatha Boardman
(74) Attorney, Agent, or Firm — Birch, Stewart, Kolasch & Birch, LLP

(57) ABSTRACT

A compressor includes: an impeller including a hub and a plurality of blades disposed on an outer surface of the hub; and a housing which houses the impeller. The housing includes: a shroud section facing the outer surface of the hub to form a fluid flow path between the shroud section and the outer surface, and surrounding the impeller; and a casing section formed integrally with the shroud section and supporting the shroud section. The shroud section includes a first resin-based material having a static tensile strength of at least 65 MPa and no more than 200 MPa and a breaking strain of no more than 0.3 mm/mm at a temperature of 100° C. The casing section includes a second resin-based material having a static tensile strength of at least 40 MPa and a breaking strain of at least 0.1 mm/mm at a temperature of 100° C.

4 Claims, 4 Drawing Sheets

(51) Int. Cl.
*F04D 17/10* (2006.01)
*F04D 25/04* (2006.01)
*F04D 29/02* (2006.01)
*F04D 29/42* (2006.01)
*F01D 9/02* (2006.01)
*F01D 25/24* (2006.01)
*F02C 6/12* (2006.01)
*F04D 29/16* (2006.01)
*F04D 29/28* (2006.01)

(52) U.S. Cl.
CPC ............. *F02C 6/12* (2013.01); *F04D 17/10* (2013.01); *F04D 29/023* (2013.01); *F02B 33/40* (2013.01); *F04D 25/045* (2013.01); *F04D 29/162* (2013.01); *F05D 2230/232* (2013.01); *F05D 2300/433* (2013.01); *F05D 2300/44* (2013.01); *F05D 2300/50212* (2013.01)

(56) References Cited

U.S. PATENT DOCUMENTS

2009/0290979 A1 11/2009 Ibaraki et al.
2012/0099980 A1 4/2012 Nishita et al.

FOREIGN PATENT DOCUMENTS

| EP | 1 830 071 A2 | 9/2007 |
| JP | 64-73197 A | 3/1989 |
| JP | 2009-281323 A | 12/2009 |
| JP | 2010-168915 A | 8/2010 |
| JP | 2010-189637 A | 9/2010 |
| JP | 2011-64118 A | 3/2011 |
| JP | 2012-524860 A | 10/2012 |
| WO | WO 2006/074934 A1 | 7/2006 |
| WO | WO 2010/122026 A1 | 10/2010 |

OTHER PUBLICATIONS

Chinese Office Action and Search Report for Chinese Application 201480078143.2, dated May 30, 2018, with English translation of the Office Action.

International Preliminary Report on Patentability dated Jan. 5, 2017, issued in International Application No. PCT/JP2014/067703 with an English Translation.

Extended European Search Report dated May 29, 2017 issued to the corresponding EP Application No. 14896761.5.

* cited by examiner

COMPRESSOR

TECHNICAL FIELD

The present disclosure relates to a compressor.

BACKGROUND ART

A compressor is, for instance, used in a turbocharger (exhaust turbocharger) mounted to an automobile or the like. A turbocharger has an exhaust turbine for converting energy of exhaust gas into power, and a compressor is driven by power outputted from the exhaust turbine. The compressor compresses air to be fed to an engine during operation, and thereby thermal efficiency of the engine improves, for instance.

A compressor includes a housing and an impeller disposed inside the housing. The impeller includes a hub and a plurality of blades disposed on an outer peripheral surface of the hub, and the outer peripheral surface has a trumpet shape. The housing has a shroud section forming a fluid flow path with the outer peripheral surface of the hub, and a fluid flows through the fluid flow path while having its speed increased by rotating blades. While the housing is normally made from metal such as cast aluminum and cast steel, resin housings are increasingly used in recent years to reduce the weight and costs, for instance.

However, a resin housing has a greater thermal expansion rate than a metal housing, and thus a gap between the housing and blades widens with a temperature increase of the housing, which may decrease the efficiency of the compressor. Furthermore, a resin housing has a lower strength than a metal housing, and needs to be reinforced by increasing the thickness of the housing or by providing a rib, to prevent fragments of an impeller from scattering outside in case of breakage of the impeller, i.e., to enhance the containment property. Such reinforcement, however, may cancel out the merits of weight reduction and cost reduction achieved by employing a resin housing.

To solve the above problems, the compressor disclosed in Patent Document 1 is provided with a metal shroud disposed between an impeller and a resin housing. The metal shroud has a smaller thermal deformation rate than resin, and thus it is possible to relatively reduce a widening amount of the gap between the metal shroud and the blades accompanying a temperature increase of the metal shroud. Thus, providing a metal shroud makes it possible to ensure a high compressor efficiency. Furthermore, a metal shroud has an excellent strength, which makes it possible to ensure a high containment property.

CITATION LIST

Patent Literature

Patent Document 1: JP2011-064118A

SUMMARY

Problems to be Solved

As disclosed in Patent Document 1, if a resin housing is used, providing a metal shroud makes it possible to ensure a high compressor efficiency and an excellent containment property. Nevertheless, whether or not a metal shroud is provided, it is desirable to ensure a high compressor efficiency and an excellent containment property through the characteristics of the resin housing itself.

In view of the above issue, an object of at least one embodiment of the present invention is to provide a compressor including a housing formed from a resin-based material and having a high compressor efficiency and an excellent containment property ensured regardless of provision of a metal shroud.

Solution to the Problems

To achieve the above object, the present inventors carried out intensive researches.

To ensure a high containment property, breakage of a housing needs to be prevented, which requires the housing to be able to absorb collision energy of fragments of an impeller by deformation. In this regard, it is desirable to form a housing from a resin-based material having a high toughness.

Resin-based materials having a relatively high toughness include PA46, for instance, which is a kind of polyamide resin. In a simulation, deformational change of a housing made only from a resin-based material whose main component is PA46 is evaluated in a condition where a metal impeller is damaged at a temperature of 100° C. As a result, the housing deforms considerably a few milliseconds after breakage of the impeller, but the deformation does not progress so far as to generate a crack in the housing.

Furthermore, to ensure a high compressor efficiency, a gap between a housing and blades of an impeller needs to be kept small, and it is desirable to use a resin-based material having a small thermal deformation rate.

PA46, however, has a great thermal deformation rate, and it would be difficult to ensure a high compressor efficiency if the compressor is provided with a housing formed only from a resin-based material whose main component is PA46.

Resin-based materials having a relatively small thermal deformation rate include PA9T, for instance, which is a kind of polyamide resin. In a simulation, deformational change of a housing made only from a resin-based material whose main component is PA9T is evaluated in a condition where a metal impeller is damaged at a temperature of 100° C. As a result, the housing cracks over the entire periphery and breaks apart a few milliseconds after breakage of the impeller. In this simulation, the breaking strain (equivalent breaking strain) is approximately 0.01 mm/mm.

The reason for such breakage of the housing may be PA9T having a low toughness despite of its suitable thermal deforming property, and thus being unable to absorb shock energy from fragments of the impeller sufficiently through deformation, which leads to brittle breakage of the housing.

On the basis of the above evaluation results, the present inventors have conducted further researches and found that it is possible to ensure a high compressor efficiency and an excellent containment property with a housing formed from resin-based materials having a static tensile strength and a breaking strain within respective predetermined ranges, thereby arriving at the present invention.

(1) A compressor according to at least one embodiment of the present invention comprises: an impeller including a hub and a plurality of blades disposed on an outer surface of the hub; and a housing which houses the impeller. The housing comprises: a shroud section facing the outer surface of the hub to form a fluid flow path between the shroud section and the outer surface, and surrounding the impeller; and a casing section formed integrally with the shroud section and supporting the shroud section. The shroud section includes a first resin-based material having a static tensile strength of at least 65 MPa and no more than 200 MPa and a breaking strain of no more than 0.3 mm/mm at a temperature of 100° C. The casing section includes a second resin-based material having a static tensile strength of at least 40 MPa and a breaking strain of at least 0.1 mm/mm at a temperature of 100° C.

With the compressor according to above embodiment (1), the first resin-based material has a static tensile strength of at least 65 MPa and no more than 200 MPa and a breaking strain of no more than 0.3 mm/mm, and thus the thermal deformation rate of the shroud section due to a temperature increase of the compressor is small. Thus, the gap between the shroud section and the blades of the impeller is kept narrow and small, and thereby a high compressor efficiency is ensured.

Furthermore, the second resin-based material has a static tensile strength of at least 40 MPa, and a breaking strain of at least 0.1 mm/mm, and thereby the casing section has a high toughness. Thus, when fragments of the impeller hit the housing, the casing section deforms and thereby absorbs energy of collision. Thus, it is possible to prevent breakage of the housing.

(2) In some embodiments, in the above configuration (1), the first resin-based material and the second resin-based material each include polyamide resin.

Polyamide resin is thermoplastic, and with the first and second resin-based materials each including polyamide resin, the housing can be produced by a simple production method such as extrusion molding, injection molding, and resin laminating. Accordingly, it is possible to reduce the time and costs required to produce a housing.

(3) In some embodiments, in the above configuration (1) or (2), the shroud section includes PA9T as the first resin-based material, and the casing section includes PA46 as the second resin-based material.

PA9T has a high resistance against thermal deformation, and thus the gap between the shroud section and the blades of the impeller is kept narrow, and thereby a high compressor efficiency is ensured. Furthermore, PA46 has a high toughness, and thus the casing section deforms to absorb collision energy of fragments of the impeller reliably, and thereby breakage of the housing is prevented.

(4) In some embodiments, in any one of the above configurations (1) to (3), the shroud section and the casing section are integrated to each other by thermal welding.

With the compressor according to the above embodiment (4), the housing can be produced readily by thermal-welding the shroud section and the casing section to each other.

Advantageous Effects

According to at least one embodiment of the present invention, provided is a compressor including a housing formed from a resin-based material and having a high compressor efficiency and an excellent containment property ensured regardless of provision of a metal shroud.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
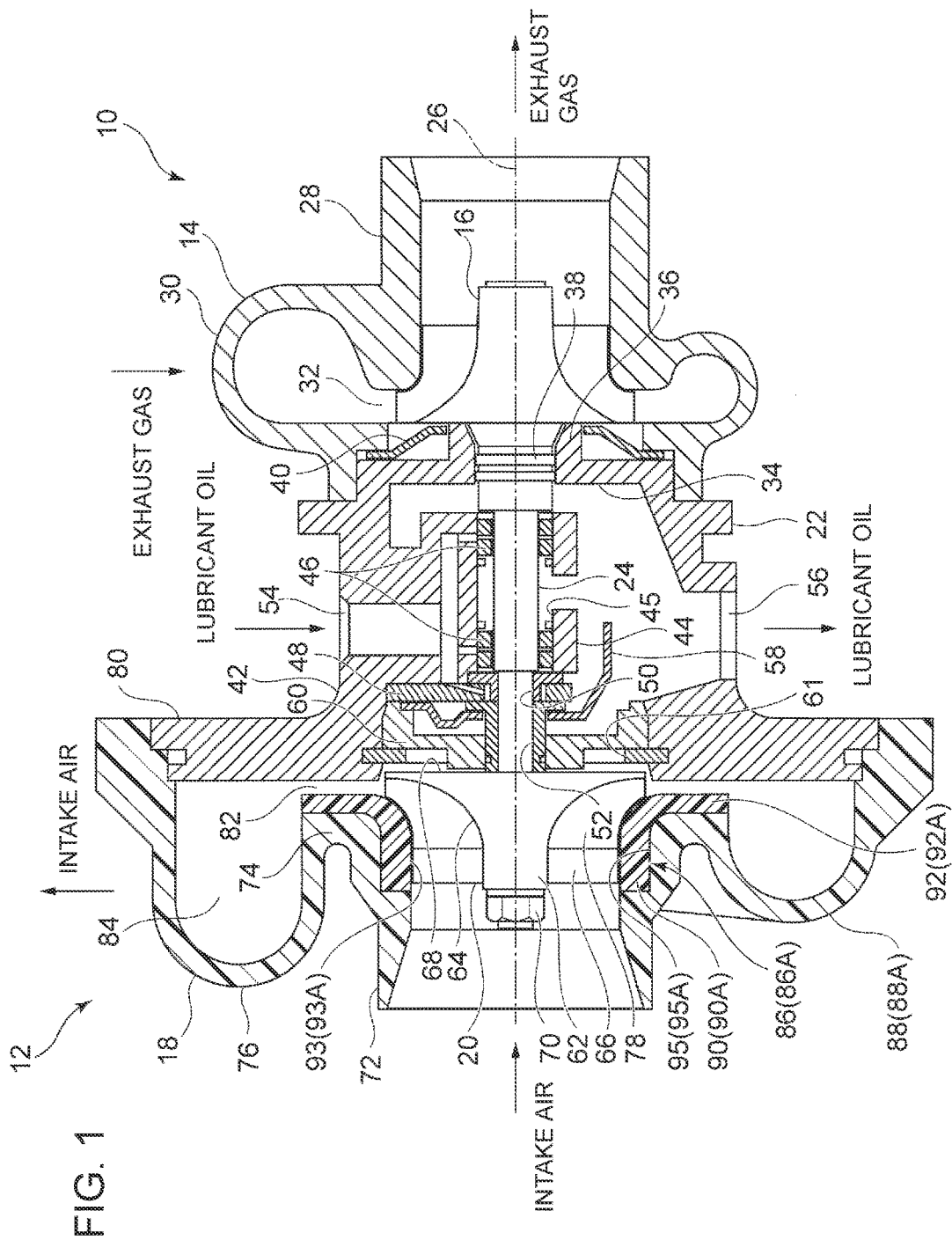
FIG. 1 is a vertical cross-sectional view schematically showing a turbocharger including a compressor according to an embodiment of the present invention.
Figure 2:
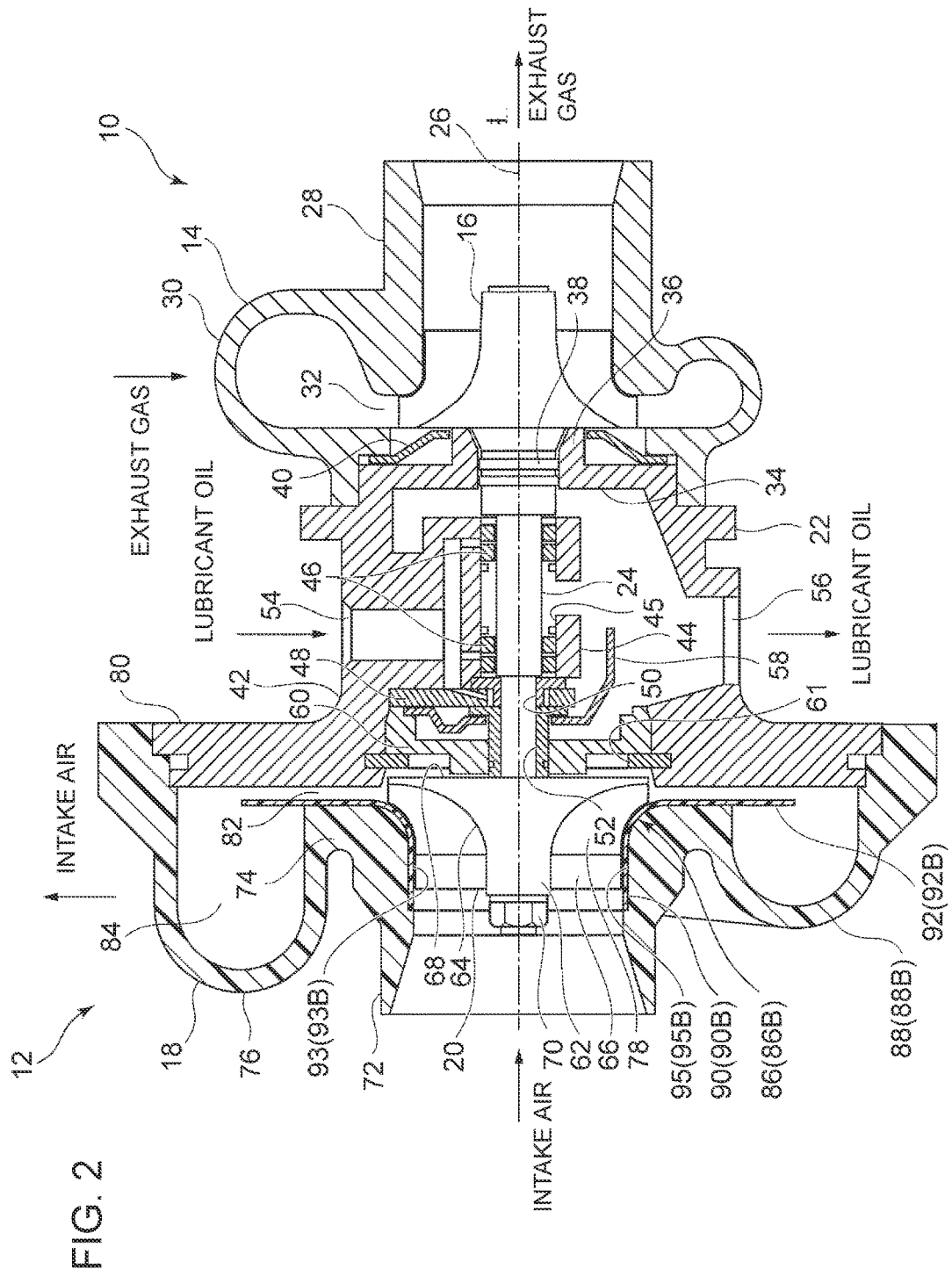
FIG. 2 is a vertical cross-sectional view schematically showing a turbocharger including a compressor according to an embodiment of the present invention.

FIGS. 1 and 2 are each a vertical cross-sectional view schematically showing a turbocharger including a compressor 12 according to some embodiments of the present invention. A turbocharger is, for instance, applied to an internal combustion engine of a vehicle, a ship, or the like.

The turbocharger includes a turbine 10 and a compressor 12 of centrifugal type. The turbine 10 includes a turbine housing 14, a turbine rotor (turbine impeller) 16 accommodated rotatably in the turbine housing 14, while the compressor 12 includes a housing 18 and an impeller (compressor impeller) 20 accommodated rotatably in the housing 18.

The turbine housing 14 and the housing 18 are fixed to a bearing housing (casing) 22 via a non-depicted fastening member, and the turbine rotor 16 of the turbine 10 and the impeller 20 of the compressor 12 are coupled to each other by a drive shaft (turbine rotor) 24 extending inside the bearing housing 22. Thus, the turbine rotor 16, the impeller 20, and the drive shaft 24 are disposed on the same axis 26. The turbine rotor 16 of the turbine 10 is rotated by exhaust gas discharged from the internal combustion engine, for instance, whereby the impeller 20 of the compressor 12 is rotated via the drive shaft 24. Rotation of the impeller 20 compresses intake air to be supplied to the internal combustion engine.

For instance, the turbine housing 14 includes a turbine cylinder (turbine shroud) section 28 which accommodates the turbine rotor 16, and a turbine scroll section 30 surrounding the turbine cylinder section 28 at a part on the side of the bearing housing 22. The turbine scroll section 30 has a non-depicted inlet of exhaust gas, and is in communication with the turbine cylinder section 28 via a throat portion 32. An opening of the turbine cylinder section 28 on the opposite side from the bearing housing 22 forms an outlet of exhaust gas.

To an opening of the turbine housing 14 on the side of the bearing housing 22, an end wall 34 of the bearing housing 22 is fitted and engaged. A seal portion 36 of a cylindrical shape is integrally and co-axially disposed on the end wall 34, and the seal portion 36 forms a seal hole penetrating through the center of the end wall 34. An end portion of the drive shaft 24 on the side of the turbine rotor 16 is disposed inside the seal portion 36, and a seal ring 38 is disposed in a gap between the drive shaft 24 and the seal portion 36.

A back plate 40 of an annular shape is disposed in an annular recess between the end wall 34 and a back surface of the turbine rotor 16. An outer circumferential portion of the back plate 40 is sandwiched by the turbine housing 14 and the bearing housing 22, and an inner circumferential edge of the back plate 40 surrounds the seal portion 36.

A bearing section 44 is disposed integrally with a peripheral wall 42 inside the bearing housing 22, and a bearing hole 45 is formed on the bearing section 44. Two floating bushes 46, for instance, are disposed inside the bearing hole 45 of the bearing section 44 to function as a radial bearing, and the center part of the drive shaft 24 is disposed inside the bearing hole 45 of the bearing section 44 while being inserted through the floating bushes 46.

A thrust member 48 of a plate shape orthogonal to an axis 26 is fixed to an end surface of the bearing section 44 on the side of the compressor 12, and the drive shaft 24 is inserted through a through hole of the thrust member 48. A thrust collar 50 and a thrust sleeve 52 are fitted onto the drive shaft 24, and the thrust member 48, the thrust collar 50, and the thrust sleeve 52 form a thrust bearing device.

An oil feed port 54 and an oil drain port 56 are disposed on the peripheral wall 42 of the bearing housing 22, and an oil feed passage for feeding lubricant oil to bearing gaps of the radial bearing and the thrust bearing is formed through the bearing section 44 and the thrust member 48. Further, an oil deflector 58 is disposed so as to cover a face of the thrust member 48 on the side of the compressor 12 to prevent lubricant oil from scattering toward the compressor 12.

A lid member 60 with a seal hole in the center is fitted onto an opening of the bearing housing 22 on the side of the compressor 12, and the lid member 60 is fixed to the bearing housing 22 by a fixing ring 61. The thrust sleeve 52 is inserted through the seal hole of the lid member 60, and a non-depicted seal ring is disposed in a gap between the thrust sleeve 52 and the seal hole.

The impeller 20 of the compressor 12 includes a hub 62 and a plurality of blades 66 disposed on an outer surface 64 of the hub 62. The hub 62 has a shape which is rotationally symmetric with respect to the axis 26. An end side of the hub 62 is disposed on the inlet side of intake air, and the other end side of the hub 62 is disposed on the side of the bearing housing 22, in a direction along the axis 26. The hub 62 has an outer surface having a trumpet shape that widens toward the opposite end side, and a back surface 68 that faces the lid member 60 on the opposite end side. The plurality of blades 66 is disposed at intervals in the circumferential direction on the outer surface 64 of the hub 62.

The drive shaft 24 is inserted through the hub 62, and a female screw is formed on a distal end side of the drive shaft 24 disposed on one end side of the hub 62, with a nut as a fastening member 70 screwed onto the female screw. The fastening member 70 is in contact with the one end side of the hub 62, and applies an axial force to the impeller 20 toward the turbine 10 in a direction along the axis 26.

The housing 18 of the compressor 12 housing the impeller 20 includes a cylindrical portion 72, a diffuser portion 74, and a scroll section 76, in terms of shape. The cylindrical portion 72 has one end side with an inlet of a fluid (intake air) to be compressed formed thereof, and the other end side with the diffuser portion 74 formed thereof integrally. The scroll section 76 is formed integrally with the diffuser portion 74, and surrounding the other end side of the cylindrical portion 72.

A fluid flow path 78 is formed between the cylindrical portion 72 and the outer surface 64 of the hub 62 of the impeller 20. A diffuser flow path 82 is formed between the diffuser portion 74 and an end wall 80 of the bearing housing 22. The scroll section 76 and the end wall 80 form a scroll flow path 84.

The fluid flow path 78 is bended outward in the radial direction of the hub 62 in accordance with the shape of the outer surface 64 of the hub 62, and is connected to the scroll flow path 84 via the diffuser flow path 82.

When the impeller 20 is rotated, the fluid to be compressed flows into the housing from the one end side of the cylindrical portion 72, runs through the fluid flow path 78, the diffuser flow path 82, and the scroll flow path 84, and is compressed. Though not depicted, an outlet of the fluid is formed on the scroll section 76, and the compressed fluid flows out of the housing 18 through the outlet.

Furthermore, with reference to FIGS. 1 and 2, the housing 18 includes a shroud section 86 (86A, 86B) and a casing section 88 (88A, 88B), in terms of the constituent material or the physical properties of the constituent material. The shroud section 86 is disposed so as to surround the impeller 20, and to face the outer surface 64 of the hub 62 of the impeller 20 to form the fluid flow path 78 with the outer surface 64. The casing section 88 is formed integrally with the shroud section 86. The casing section 88 is fixed to the bearing housing 22 and supporting the shroud section 86.

Figure 3:
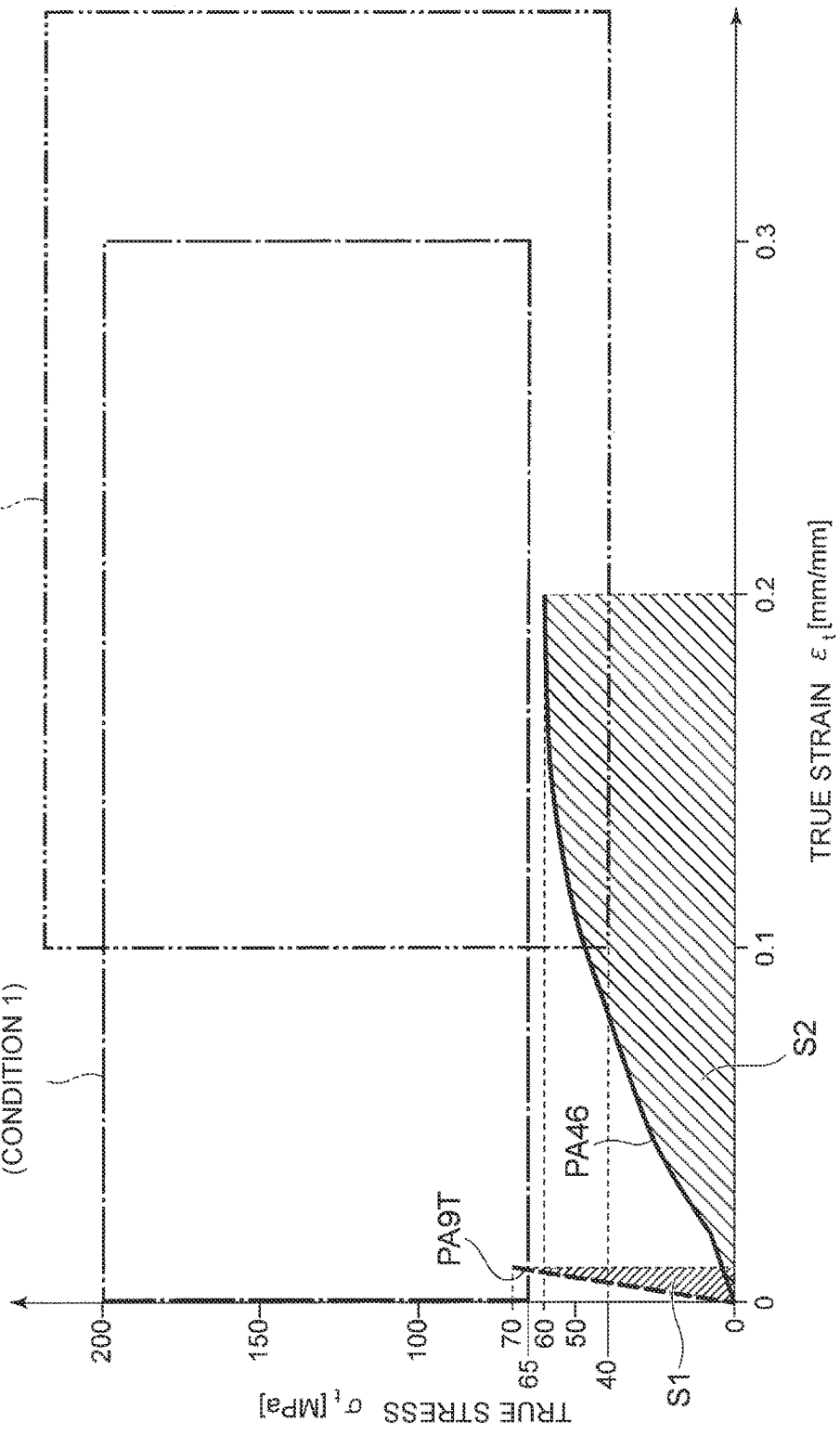
FIG. 3 is an exemplary stress-strain diagram of the first and second resin-based materials.

FIG. 3 is an exemplary stress-strain diagram of the first and second resin-based materials.

The shroud section 86 includes the first resin-based material, and in some embodiments, includes the first resin-based material as the main component. In some embodiments, the shroud section 86 is substantially made of the first resin-based material. The first resin-based material has a static tensile strength (maximum actual stress) of at least 65 MPa and no more than 200 MPa, and a breaking strain of more than 0 mm/mm and no more than 0.3 mm/mm, at a temperature of 100° C.

The casing section 88 includes the second resin-based material, and in some embodiments, includes the second resin-based material as the main component. In some embodiments, the casing section 88 is substantially made of the second resin-based material. The second resin-based material has a static tensile strength (maximum actual stress) of at least 40 MPa, and a breaking strain of at least 0.1 mm/mm, at a temperature of 100° C.

In some embodiments, the second resin-based material has a breaking strain of at least 0.2 mm/mm.

In some embodiments, the second resin-based material has a static tensile strength of no more than 150 MPa and a breaking strain of no more than 0.4 mm/mm.

The static tensile strength and the breaking strain of the first and second resin-based materials are values obtained by a tensile test.

With the above described compressor 12, the housing 18 includes the shroud section 86 including the first resin-based material and the casing section 88 including the second resin-based material, whereby the compressor 12 can be reduced in weight.

Furthermore, with the above described compressor 12, the first resin-based material has a static tensile strength of at least 65 MPa and no more than 200 MPa and a breaking strain of no more than 0.3 mm/mm, and thus the thermal deformation rate of the shroud section 86 due to a temperature increase of the compressor 12 is small. Thus, the gap between the shroud section 86 and the blades 66 of the impeller 20 is kept narrow and small, and thereby a high compressor efficiency is ensured.

Furthermore, the second resin-based material has a static tensile strength of at least 40 MPa and a breaking strain of at least 0.1 mm/mm, and thereby the casing section 88 has a high toughness. Thus, when fragments of the impeller 20 hit the housing 18, the casing section 88 deforms and thereby absorbs energy of collision. Thus, it is possible to prevent breakage of the housing 18.

In some embodiments, the first and second resin-based materials each include polyamide resin.

Polyamide resin is thermoplastic, and with the first and second resin-based materials each including polyamide resin, the housing 18 can be produced by a simple production method such as extrusion molding, injection molding, and resin laminating. Accordingly, it is possible to reduce the time and costs required to produce the housing 18.

In some embodiments, the shroud section 86 includes PA9T as the first resin-based material, and the casing section 88 includes PA46 as the second resin-based material.

PA9T has a high resistance property against thermal deformation, and thus the gap between the shroud section 86 and the blades 66 of the impeller 20 is kept narrow, and thereby a high compressor efficiency is ensured. Furthermore, PA46 has a high toughness, and thus the casing section 88 deforms to absorb collision energy of fragments of the impeller 20 reliably, and thereby breakage of the housing 18 is prevented.

Toughness is expressed by a value obtained by integration of a true stress with a true strain from the stress-strain diagram in FIG. 3, and the integral range is from zero to the breakage strain. Accordingly, the toughness of PA9T is represented by area S1, and the toughness of PA46 is represented by area S2. Area S2 is larger than area S1, which indicates superiority of PA46 over PA9T in toughness.

In some embodiments, the shroud section 86 and the casing section 88 are integrated by thermal welding.

The housing 18 can be produced readily by thermal-welding the shroud section 86 and the casing section 88, which are formed separately, to each other.

In some embodiments, the first resin-based material is a fiber-reinforced plastic including polyamide resin and glass fiber which is long fiber having a fiber length of at least 1 mm and no more than 2 mm.

In some embodiments, the second resin-based material is a fiber-reinforced plastic including polyamide resin and glass fiber which is short fiber having a fiber length of at least 0.1 mm and no more than 0.2 mm.

Figure 4:
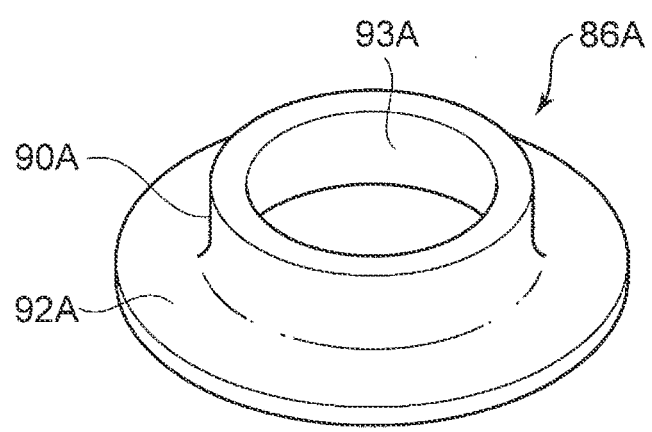
FIG. 4 is a perspective view schematically showing the shroud section in FIG. 1.

FIG. 4 is a perspective view schematically showing the shroud section 86A in FIG. 1. With reference to FIGS. 1, 2, and 4, in some embodiments, the shroud section 86 includes a cylindrical portion 90 (90A, 90B) and a flange portion 92 (92A, 92B). The flange portion 92 is disposed continuously from one end side of the cylindrical portion 90, and the cylindrical portion 90 has an inner peripheral surface 93 (93A, 93B) which expands gradually at one end side toward the flange portion 92 and has a trumpet shape. The fluid flow path 78 is formed between the inner peripheral surface 93 of the cylindrical portion 90 and the outer surface 64 of the hub 62, while the diffuser flow path 82 is formed between the flange portion 92 and the end wall 80 of the bearing housing 22.

In some embodiments, as depicted in FIGS. 1 and 2, the casing section 88 includes a recess portion 95 (95A, 95B) in which the cylindrical portion 90 of the shroud section 86 is to be disposed, and the inner peripheral surface of the cylindrical portion 72 of the housing 18 is formed flush by the casing section 88 and the shroud section 86.

In some embodiments, the casing section 88 extends continuously from the cylindrical portion 72 of the housing 18 toward the scroll section 76 via the diffuser portion 74, and the cylindrical portion 72 and the scroll section 76 are bridged by a part of the casing section 88. With this configuration, the casing section 88 extends continuously from the cylindrical portion 72, to the diffuser portion 74 to the scroll section 76, and thereby it is possible to absorb collision energy efficiently.

In some embodiments, the outer surface of the housing 18 is formed by the casing section 88.

In some embodiments, as depicted in FIG. 1, the outer edge of the flange portion 92A in the radial direction is disposed inside the scroll flow path 84 in the radial direction.

In some embodiments, as depicted in FIG. 2, the outer edge of the flange portion 92B in the radial direction is disposed inside the scroll flow path 84.

Embodiments of the present invention have been described in detail above, but the present invention is not limited thereto, and various amendments and modifications may be implemented.

While the first and second resin-based materials are different from each other in the above embodiments, the materials may be the same. In this case, the resin-based material used as the first and second resin-based materials has a static tensile strength (maximum actual stress) of at least 65 MPa and no more than 200 MPa, and a breaking strain of at least 0.1 mm/mm and no more than 0.3 mm/mm, at a temperature of 100° C.

In some embodiments, the first and second resin-based materials may include a reinforcement material other than glass fiber, such as carbon fiber. Alternatively, the first and second resin-based materials do not necessarily include a reinforcement material.

While the casing section 88 and the shroud section 86 are joined by thermal welding in some embodiments, the casing section 88 and the shroud section 86 may be joined with an adhesive agent.

While the cylindrical portion 90B and the flange portion 92B have the same thickness in some embodiments as depicted in FIG. 2, the thicknesses of the cylindrical portion 90 and the flange portion 92 are not particularly limited.

In some embodiments, the housing 18 may further include a recirculation channel formed for returning a part of the fluid flowing through the fluid flow path 78 to upstream.

Finally, the present invention is applicable to a compressor other than that of an automobile turbocharger. For instance, the present invention is also applicable to a compressor of a car air conditioner or a compressor of a ship turbocharger.

The invention claimed is:

1. A compressor, comprising:
    an impeller including a hub and a plurality of blades disposed on an outer surface of the hub; and
    a housing which houses the impeller,
    wherein the housing comprises:
        a shroud section facing the outer surface of the hub to form a fluid flow path between the shroud section and the outer surface, and surrounding the impeller; and
        a casing section formed integrally with the shroud section and supporting the shroud section,
    wherein the shroud section includes a first resin-based material having a static tensile strength of at least 65

MPa and no more than 200 MPa and a breaking strain of no more than 0.3 mm/mm at a temperature of 100° C., and wherein the casing section includes a second resin-based material having a static tensile strength of at least 40 MPa and a breaking strain of at least 0.1 mm/mm at a temperature of 100°C.

2. The compressor according to claim 1, wherein the first resin-based material and the second resin-based material include polyamide resin.

3. The compressor according, to claim 1, wherein the shroud section includes PA9T as the first resin-based material, and the casing section includes PA46 as the second resin-based material.

4. The compressor according to claim 1, wherein the shroud section and the casing section are integrated to each other by thermal welding.

* * * * *